(No Model.) 3 Sheets—Sheet 1.
G. B. DAVISON.
PLANTER.
No. 601,870. Patented Apr. 5, 1898.
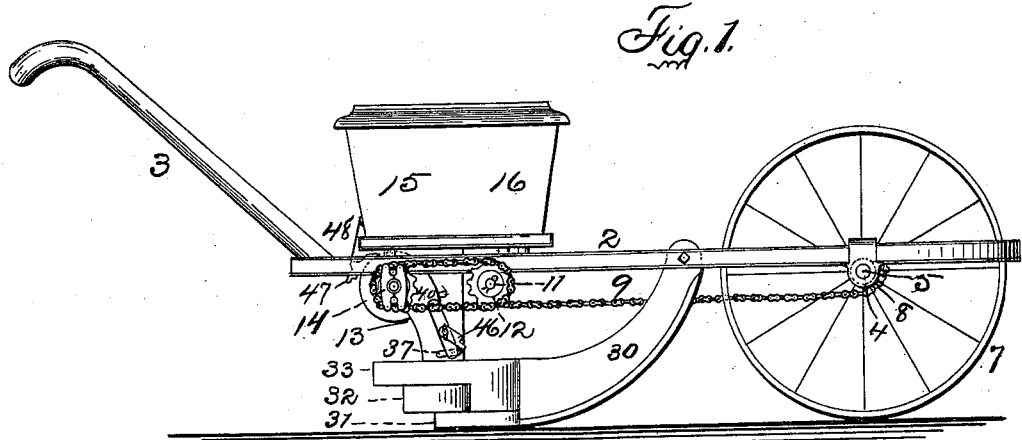
Fig. 1.
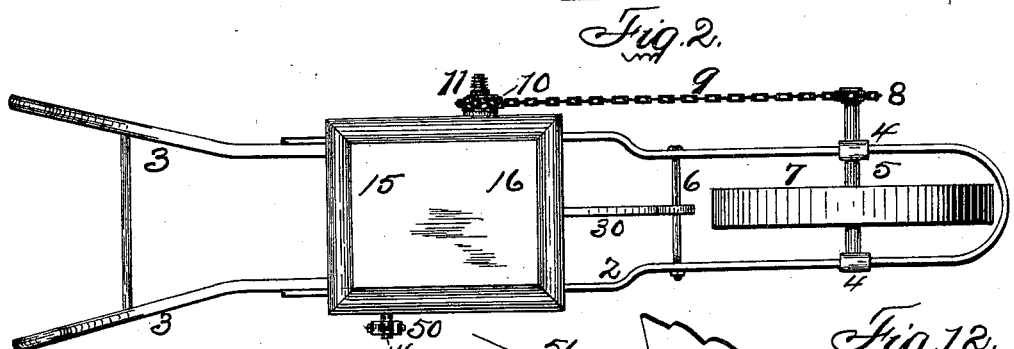
Fig. 2.
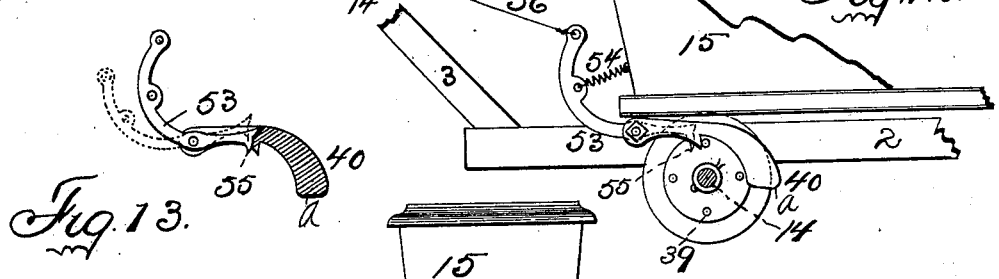
Fig. 12.
Fig. 13.
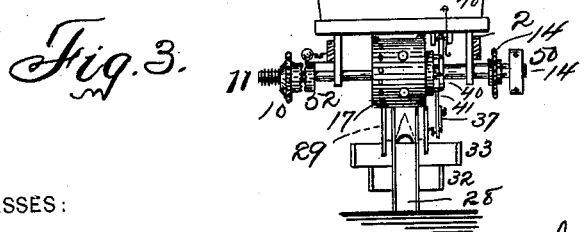
Fig. 3.
WITNESSES:
Charles Marvin
Mary A. Franklin
INVENTOR
George B. Davison.
BY
Smith & Denison
ATTORNEYS.

(No Model.) 3 Sheets—Sheet 2.

G. B. DAVISON.
PLANTER.

No. 601,870. Patented Apr. 5, 1898.

WITNESSES:
Charles W. Marvin.
Mary A. Franklin

INVENTOR
George B. Davison.
BY
Smith & Denison
ATTORNEYS.

THE NORRIS PETERS CO., PHOTO-LITHO., WASHINGTON, D. C.

(No Model.) 3 Sheets—Sheet 3.

G. B. DAVISON.
PLANTER.

No. 601,870. Patented Apr. 5, 1898.

WITNESSES:
Charles Marvin
Mary A. Franklin

INVENTOR
George B. Davison.
BY
Smith & Denison
ATTORNEYS.

UNITED STATES PATENT OFFICE.

GEORGE BENNETT DAVISON, OF UTICA, NEW YORK, ASSIGNOR TO THE EUREKA MOWER CO., OF SAME PLACE.

PLANTER.

SPECIFICATION forming part of Letters Patent No. 601,870, dated April 5, 1898.

Application filed October 15, 1897. Serial No. 655,316. (No model.)

*To all whom it may concern:*

Be it known that I, GEORGE BENNETT DAVISON, of Utica, in the county of Oneida, in the State of New York, have invented new and useful Improvements in Planters, of which the following, taken in connection with the accompanying drawings, is a full, clear, and exact description.

My invention relates to planters, and particularly to that class which are provided with a fertilizing attachment which can be used simultaneously with the dropping mechanism whether for planting in hills or rows, or the dropping can be done without fertilizing, such machine being horse or hand propelled or of the wheelbarrow type.

The object of this invention is to provide a planter with a mechanism whereby the grain or seed is not positively mixed with the fertilizer at the instant of planting, but the latter is scattered or diffused around or on both sides of the grain or seed, which prevents the heat from burning and destroying it, and also thus fertilizing a larger area around or adjoining each hill or row.

The further object is to provide an improved valve mechanism to be operated intermittently for dropping in hills at predetermined intervals or spaces or to be set so as to permit free and continuous flow of both seed and fertilizer.

It is constructed as follows, reference being had to the accompanying drawings, in which—

Figure 4:
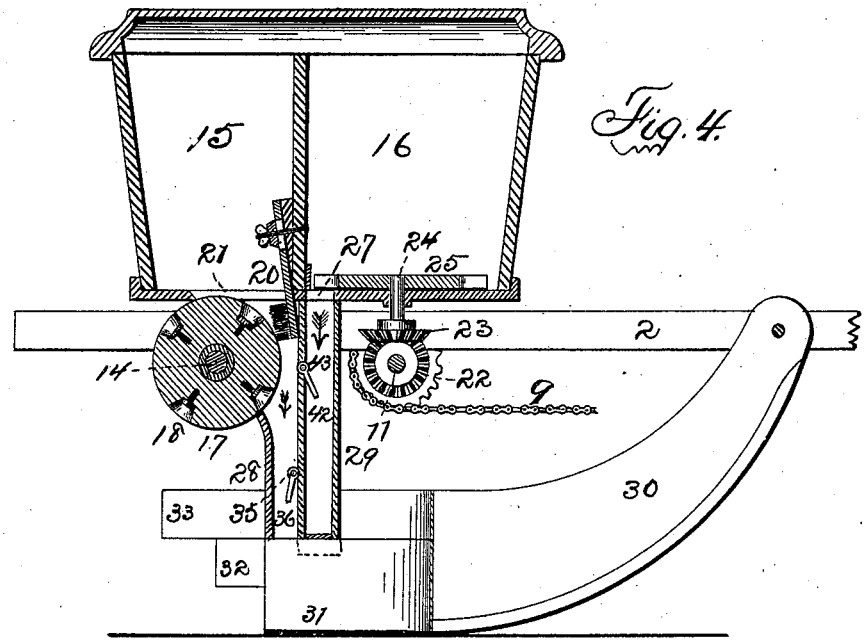
Figure 5:
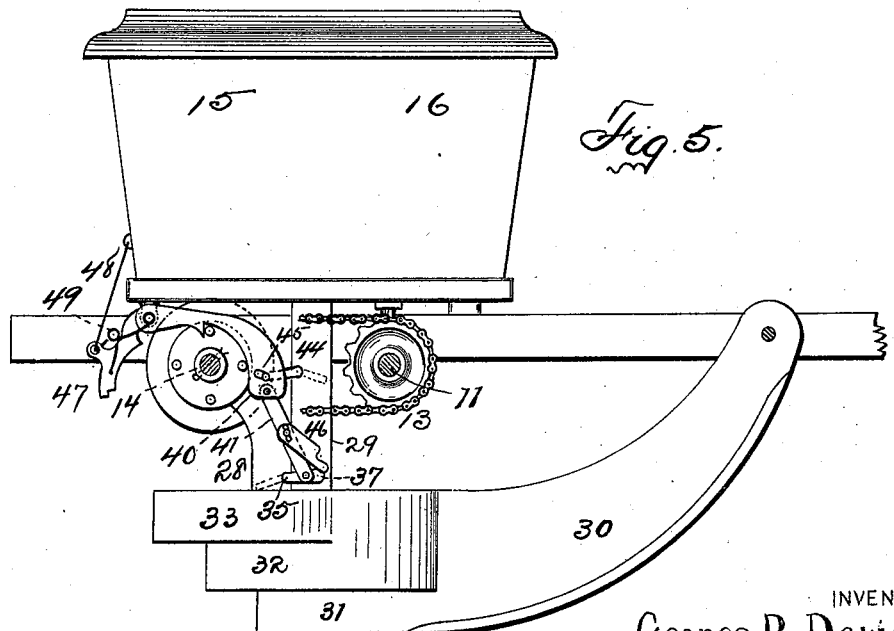
Figure 6:
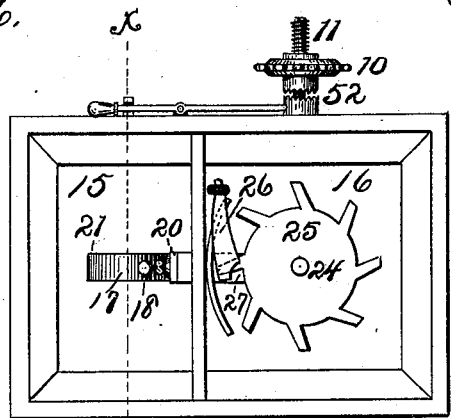
Figure 9:
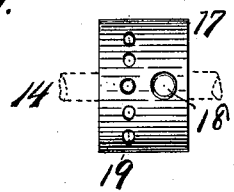
Figure 10:
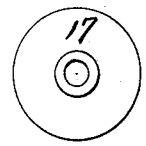
Figure 7:
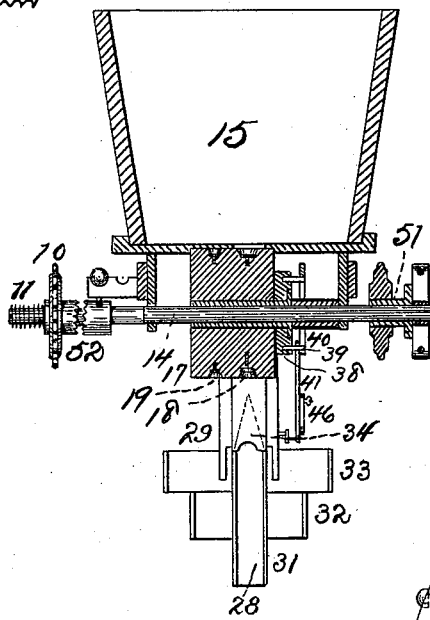
Figure 8:
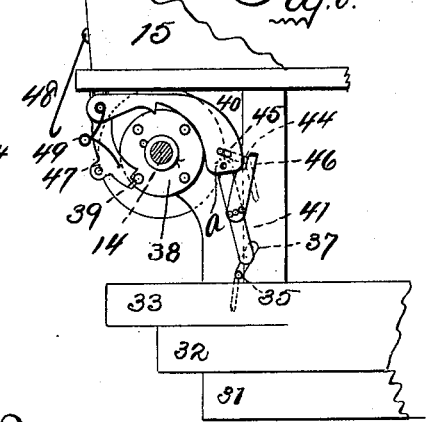
Figure 11:
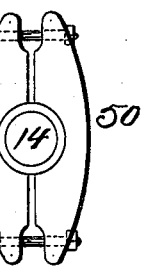

Figure 1 is a side elevation of the planter. Fig. 2 is a top plan thereof. Fig. 3 is a rear elevation thereof. Fig. 4 is a vertical section. Fig. 5 is a side elevation enlarged. Fig. 6 is a top plan of the seedbox and fertilizer-hopper with their covers removed to expose their interiors. Fig. 7 is a vertical cross-section on line $x$ $x$ in Fig. 6. Fig. 8 is an enlarged detail of the mechanism for intermittently operating the discharge or feed valves and the devices for setting it to hold them open. Fig. 9 is a top plan of the seed-feed roller or cylinder detached. Fig. 10 is an end elevation of the same. Fig. 11 is a detail of the friction-clutch upon the driving-shaft. Fig. 12 is an elevation detailing a slightly different seed-feed mechanism from that shown in the other figures. Fig. 13 is a detail of the feed-pawl and stop-dog shown in Fig. 12 detached, the dotted lines indicating the swing of the dog.

A suitable frame 2 is provided with handles 3, bearings 4 for a shaft 5, and a cross-bar 6. Upon the shaft 5 a wheel 7 is secured, and 8 is a sprocket, also secured thereon, carrying and driving a belt 9, which drives a sprocket 10 on a shaft 11, suitably journaled upon said frame, and by means of a sprocket 12 thereon and belt 13 drives a sprocket and shaft 14. The shaft 14 is the feed-operating shaft, and the shaft 11 is the fertilizer-feed shaft.

Upon the frame the seedbox 15 and fertilizer-hopper 16 are mounted in any suitable manner.

Upon the shaft 14 a cylinder 17 is secured, provided with a series of large pockets 18 for hill-planting and a series of smaller ones 19 for row-planting and an adjustable brush 20 for a seed cut-off, a suitable opening 21 being provided in the bottom of the seedbox.

A bevel-gear 22 on the shaft 11 drives a like gear 23 on the vertical shaft 24, which carries a rotating fertilizer-feeding armed wheel 25, and 26 is a suitable lump-breaker contiguous to the discharge-opening 27 in this hopper.

A suitable discharge spout or chute 28 is provided for the seed and another spout 29 for the fertilizer.

A ground or furrow opener 30 is suitably connected to the cross-bar 6, of substantially the form shown in the drawings, with suitably beveled and sharpened cutting edges and comprising lower flaring wings 31, connected to or in alinement with the lower end of the seed-chute, intermediate wings 32, and upper wings 33, all of said wings merging at their front ends, substantially as shown.

The fertilizer-chute is wider than the seed-chute and is provided with an inclined bottom 34, whereby the fertilizer is deflected laterally, so that it falls on either side of the path of the seed-chute and of the dropped seed and not on top of it, as is customary.

Upon one side of the seed-chute a rock-shaft 35 is suitably mounted, carrying a damper or valve 36 within the chute and provided with an external crank 37.

A disk 38 is mounted upon and rotated by the shaft 14 and provided with a number of pins 39 equal in number to the number of the large seed-pockets in the seed-cylinder, and 40 is a pawl hung upon the seedbox and provided with a beveled tooth $a$, as shown, with which said pins successively engage. The free end of said pawl is suitably connected by a connecting rod or link 41 to the crank 37, whereby as each tooth raises said pawl said rock-shaft is rocked to swing the valve down and open the chute to discharge the seed which has collected thereon, so that it all drops at once to form a hill.

In the fertilizer-chute is a valve 42 upon a rock-shaft 43, provided with a crank 44, connected to the pawl 40 by a slot-and-pin connection 45, whereby each time said pawl is raised, as aforesaid, said valve is opened and the fertilizer collected thereon is dropped simultaneously with the seed.

A dog 46 is hung upon the link 41, so that when swung upward it will engage with the raised pawl 40 and support it, and thus hold both valves open, which is desirable when planting seed in rows.

A stop-dog 47 is carried by a hook 48, while the seed-cylinder is revolving for either hill or row planting, and when it is desired to stop the cylinder and its feed, as when turning around or going to or from the field, it is unhooked, and the spring 49 throws it into position to engage with one of said pins and stop said cylinder. In such case the power remaining on the friction-bearing 50 upon the hub 51 of the sprocket permits said sprocket to revolve upon said shaft 14, thus held stationary, and to drive said shaft as soon as said stop-dog is removed.

An ordinary clutch (and means to shift it) 52 operates to apply or remove the power from the shaft 11, stopping all feed of either seed or fertilizer.

In Figs. 12 and 13 I show a seed-feed mechanism which is under the control of the operator, in which the stop-dog 53 is normally maintained in position by a spring 54 to lock the pawl 40, so that it cannot be raised or jolted to permit a pin 39 to pass under it; but at the same time the point 55 projects through said pawl into position to be first engaged by said pin and tilted, as shown in Fig. 13, which releases the pawl to be lifted by said pin for intermittent or hill dropping. The valve mechanisms can be connected to and actuated by said pawl, as shown in Figs. 5 and 8, as also the dog 46 to lock said pawl open for row-dropping. In case the operator desires to drop seed at any intermediate point between hills he pulls upon the string or wire 56 to tilt said stop-dog and release said pawl. This stop-dog is pivoted between the arms of a bifurcation in the pawl 40.

Having described my invention, what I claim, and desire to secure by Letters Patent, is—

1. In a planter, the combination with a ground-opener comprising a body and wings thereon of varying outward projection, arranged in pairs, and tiers in different planes, of a fertilizer-hopper and a chute leading therefrom toward the path of the body of said opener, and a deflector in the bottom of said chute whereby the fertilizer is deflected into the paths of the upper tier of wings of said opener.

2. In a planter the combination with a seedbox and a fertilizer-hopper, and a ground-opener comprising a body and diverging wings of varying projection arranged in tiers one above another, of a seed-chute leading from the seedbox to the path of the lowermost tier of said wings, and a fertilizer-chute leading from the fertilizer-hopper to said opener, and a deflector in said chute whereby the fertilizer is spread into the paths of the upper tier or tiers of said wings.

3. In a planter, a seedbox, a fertilizer-hopper, a power-driven shaft, a feed-distributing cylinder mounted thereon, and discharge-chute from said box and hopper combined with separate valves normally closing said chutes, a disk upon said shaft, provided with pins at spaced intervals, a pawl intermittently engaged by said pins and connected to both of said valves, whereby both are simultaneously opened each time one of said pins engages with said pawl, which is provided with a beveled tooth whereby said pawl is raised to open said valves by the engagement of each tooth therewith, and which locks said disk against backward rotation.

In witness whereof I have hereunto set my hand this 2d day of October, 1897.

GEORGE BENNETT DAVISON.

In presence of—
  FRED GIBSON,
  O. J. CHILDS.